(12) United States Patent
Schmidt et al.

(10) Patent No.: US 9,251,615 B2
(45) Date of Patent: Feb. 2, 2016

(54) THERMAL IMAGE ANIMATION

(71) Applicant: Fluke Corporation, Everett, WA (US)

(72) Inventors: Matthew F. Schmidt, River Falls, WI (US); Jordan B. Schlichting, Rogers, MN (US); Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 160 days.

(21) Appl. No.: 13/833,853

(22) Filed: Mar. 15, 2013

(65) Prior Publication Data

US 2014/0267353 A1    Sep. 18, 2014

(51) Int. Cl.
| | |
|---|---|
| G06T 13/00 | (2011.01) |
| G06T 11/60 | (2006.01) |
| G06T 11/00 | (2006.01) |
| H04N 5/33 | (2006.01) |
| G09G 5/02 | (2006.01) |
| G09G 5/14 | (2006.01) |
| G09G 3/28 | (2013.01) |
| G09G 5/00 | (2006.01) |
| G09G 5/10 | (2006.01) |
| H04N 5/228 | (2006.01) |
| H04N 5/46 | (2006.01) |
| G06K 9/00 | (2006.01) |
| H04N 5/232 | (2006.01) |
| H04N 5/45 | (2011.01) |
| H04N 9/73 | (2006.01) |
| H04N 1/46 | (2006.01) |
| G06K 9/40 | (2006.01) |
| G06K 9/32 | (2006.01) |

(Continued)

(52) U.S. Cl.
CPC .............. *G06T 13/00* (2013.01); *G06T 11/001* (2013.01); *G06T 11/60* (2013.01); *H04N 5/23216* (2013.01); *H04N 5/23293* (2013.01); *H04N 5/332* (2013.01)

(58) Field of Classification Search
USPC ................ 345/581, 589, 593–594, 619, 660, 345/629–630, 501, 547, 207, 690–691, 696, 345/48, 63, 76–66, 84, 88; 348/169, 174, 348/179, 552–553, 557, 564–565, 602, 348/655; 358/518, 520; 382/162, 167, 254, 382/274, 298–299; 250/330, 332, 336.1, 250/337, 338.1, 339.01
See application file for complete search history.

(56) References Cited

U.S. PATENT DOCUMENTS 6,303,411 B1 * 10/2001 Camm .............. H01L 21/67115
                                                            392/416
7,304,297 B1 * 12/2007 King et al. .................. 250/252.1

(Continued)

OTHER PUBLICATIONS

Extended Search Report for Application No. 14160235.9, Aug. 29, 2014, 7 pages.

Primary Examiner — Wesner Sajous
(74) Attorney, Agent, or Firm — Fredrikson & Byron, P.A.

(57) ABSTRACT

Animation of a thermal image captured by a thermal imager that includes automatically changing particular aspects of the presentation of the image. The coloring of the thermal image may automatically change through two or more color presentations. The colors which may automatically change or be "animated" may be any colors in the usual rainbow of color or in the grayscale. The animation may include a series of small, stepwise incremental changes that gradually change the image. If timed correctly and if the increments are sufficiently small, the transitions of the image may appear smooth, in the manner of a movie or cartoon.

37 Claims, 6 Drawing Sheets

(51) Int. Cl.
  *H01L 31/00*       (2006.01)
  *G01T 1/00*        (2006.01)

(56) References Cited

U.S. PATENT DOCUMENTS

| | | | |
|---|---|---|---|
| 7,535,002 B2 | 5/2009 | Johnson et al. | |
| 7,639,843 B2 | 12/2009 | McManus et al. | |
| 7,693,679 B1 * | 4/2010 | Warnke et al. | 702/132 |
| 8,386,951 B2 | 2/2013 | Tallman | |
| 2008/0150957 A1 * | 6/2008 | Cimbalista | 345/589 |
| 2008/0308732 A1 * | 12/2008 | Warnke et al. | 250/330 |
| 2009/0050806 A1 * | 2/2009 | Schmidt et al. | 250/332 |
| 2010/0058222 A1 * | 3/2010 | Bergstrom et al. | 715/782 |
| 2010/0118137 A1 * | 5/2010 | Avila et al. | 348/125 |
| 2011/0297829 A1 * | 12/2011 | Altmann et al. | 250/332 |
| 2013/0048855 A1 * | 2/2013 | Abreo | H04N 5/33 250/330 |
| 2013/0188058 A1 * | 7/2013 | Nguyen et al. | 348/164 |
| 2013/0307992 A1 | 11/2013 | Erlandsson | |
| 2014/0042319 A1 * | 2/2014 | Pickett et al. | 250/330 |

* cited by examiner

THERMAL IMAGE ANIMATION

BACKGROUND

Thermal imaging cameras are used to observe temperature variations in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Thermal imaging cameras include sensors for detecting infrared energy in a scene being viewed by the camera. An example of such a sensor is a focal plane array (FPA) which generates an electrical signal in response to infrared energy received through the camera lens. The FPA includes sensor elements, such as bolometers or photon detectors, and each such sensor element may be referred to as a sensor pixel. The electrical resistance or voltage of the sensor pixels changes in response to infrared energy and can therefore be used to generate a thermal image or thermogram.

While the thermal images provided by thermal imaging cameras are very useful, they include an abundance of information and therefore can be complex. As a result, the full scope of information provided by a thermal image may not be easily understood by a user. It is therefore advantageous to present thermal images to users in ways that allow the users to more readily observe and understand the temperature information provided by a thermal image.

SUMMARY

Certain embodiments of the invention include a computer readable medium comprising instructions that cause a programmable processor to control a graphical user interface for the display of thermal images. The graphical computer interface includes a display area presenting an image of a scene, where the image was captured by a thermal imaging device. The image may be displayed as a visible light image, a thermal image, or a combined visible light and thermal image. The thermal portions of the image are displayed in a first color scale or a monochromatic scale, such as a gray scale. The displayed image includes a temperature band representing a range of temperatures where the range of temperatures are between a band maximum temperature and a band minimum temperature. A portion of the image having a temperature which falls within the range of temperatures is presented in a color or in a second color scale or monochromatic scale that contrasts with the first color scale or monochromatic scale. The band maximum temperature and the band minimum temperature automatically and incrementally increase or decrease over time such that the portion of the displayed image having a temperature which falls within the range of temperatures changes over time.

Certain embodiments of the invention include a thermal imaging camera that includes an infrared sensor assembly, a lens configured to focus infrared energy on the infrared sensor assembly, a housing, a display, a processor, and a software program used by the processor for providing a graphical user interface on the display operable on the processor. The graphical user interface includes an image display area presenting an image of a scene where the image is captured by a thermal imaging device. The image is displayed as a visible light image, a thermal image in a first color scale, or a combined visible light image and thermal image in the first color scale. The image includes a temperature band representing a range of temperatures where the range of temperatures being between a band maximum temperature and a band minimum temperature. A portion of the image has a temperature which falls within the range of temperatures is presented in a color or in a second color scale that contrasts with the first color scale. The band maximum temperature and the band minimum temperature automatically and incrementally increase or decrease over time such that the portion of the displayed image having a temperature which falls within the range of temperatures changes over time.

Certain embodiments of the invention provide a thermal image visualization system that includes a processor and a software program operable on the processor for controlling a graphical user interface for the display of thermal images. The graphical user interface includes an image display area presenting an image of a scene, the image being displayed as a visible light image, a thermal image, or a combined visible light image and thermal image. The displayed image repeatedly cycles through two or more color scales by each cycle automatically and sequentially appearing in the two or more color scales.

Certain embodiments of the invention include a computer-readable storage medium comprising instructions that cause a programmable processor to control a graphical user interface for the display of thermal images. The graphical user interface includes an image display area presenting a composite image of a scene, where the composite image composed of a blended ratio of a visible light image of the scene and a thermal image of the scene. The composite image automatically, continuously, and repeatedly cycles between two or more successive blending ratios where each successive blending ratio progressively increases or progressively decreases.

Certain embodiments of the invention include a thermal image visualization system that has a processor and a software program operable on the processor for controlling a graphical user interface for the display of thermal images. The graphical user interface includes an image display area presenting a thermal image of a scene where the thermal image is displayed with a color or monochromatic palette of colors having a span and a level. The thermal image automatically, continuously, and repeatedly cycles between two or more successive span amounts and/or level amounts where each successive span amount and/or level amount progressively increases or progressively decreases.

DETAILED DESCRIPTION

Figure 1:
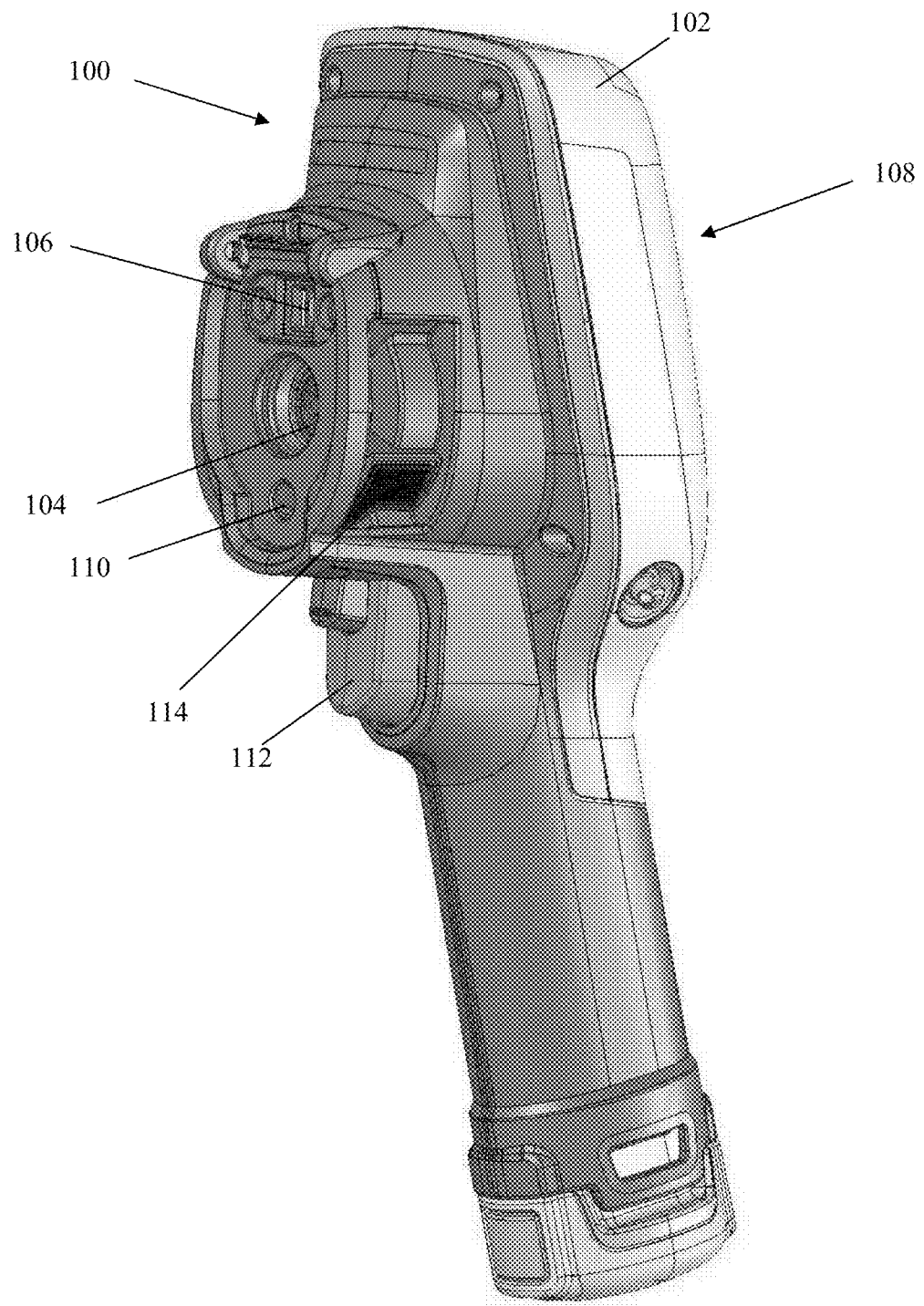
FIG. 1 is a perspective front view of an example thermal imaging camera.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. A non-limiting example of such a thermal imaging camera may be found in U.S. Pat. No. 7,535,002, entitled "Camera with visible light and infrared image blending," which is hereby incorporated by reference. Depending on the configuration of the thermal imaging camera, the camera may include infrared optics to focus the infrared radiation on an infrared sensor and visible light optics to focus the visible light on a visible light sensor.

An image of a scene captured by a thermal imaging camera can be displayed on a view screen of the thermal imaging camera or on a screen separate from the thermal imaging camera, as a thermal image, a visible light image, or a blended thermal image and visible light image. Furthermore, a variety of color spectrums may be used to enhance the display of different temperatures shown in the image. However, it can still be difficult to interpret the heat patterns shown in the thermal image. Various embodiments therefore provide animated presentation of the thermal image in order to allow a user to better view and understand the heat patterns shown in the image.

As used herein, "animated presentation," also referred to as "animation," refers to automatically changing particular aspects of the presentation of the image. For example, the coloring of the thermal image may automatically change through two or more color presentations. The colors which may automatically change or be "animated" may be any colors in the usual rainbow of color or in the greyscale, and the word color as used herein is intended to encompass both colors and shades of gray. The animation may include a series of small, stepwise incremental changes that gradually change the image. If timed correctly and if the increments are sufficiently small, the transitions of the image may appear smooth, in the manner of a movie or cartoon. In some embodiments, the changes may be fewer, and the animation may include as few as two different coloration states, with the animation toggling between the two states.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Figure 2:
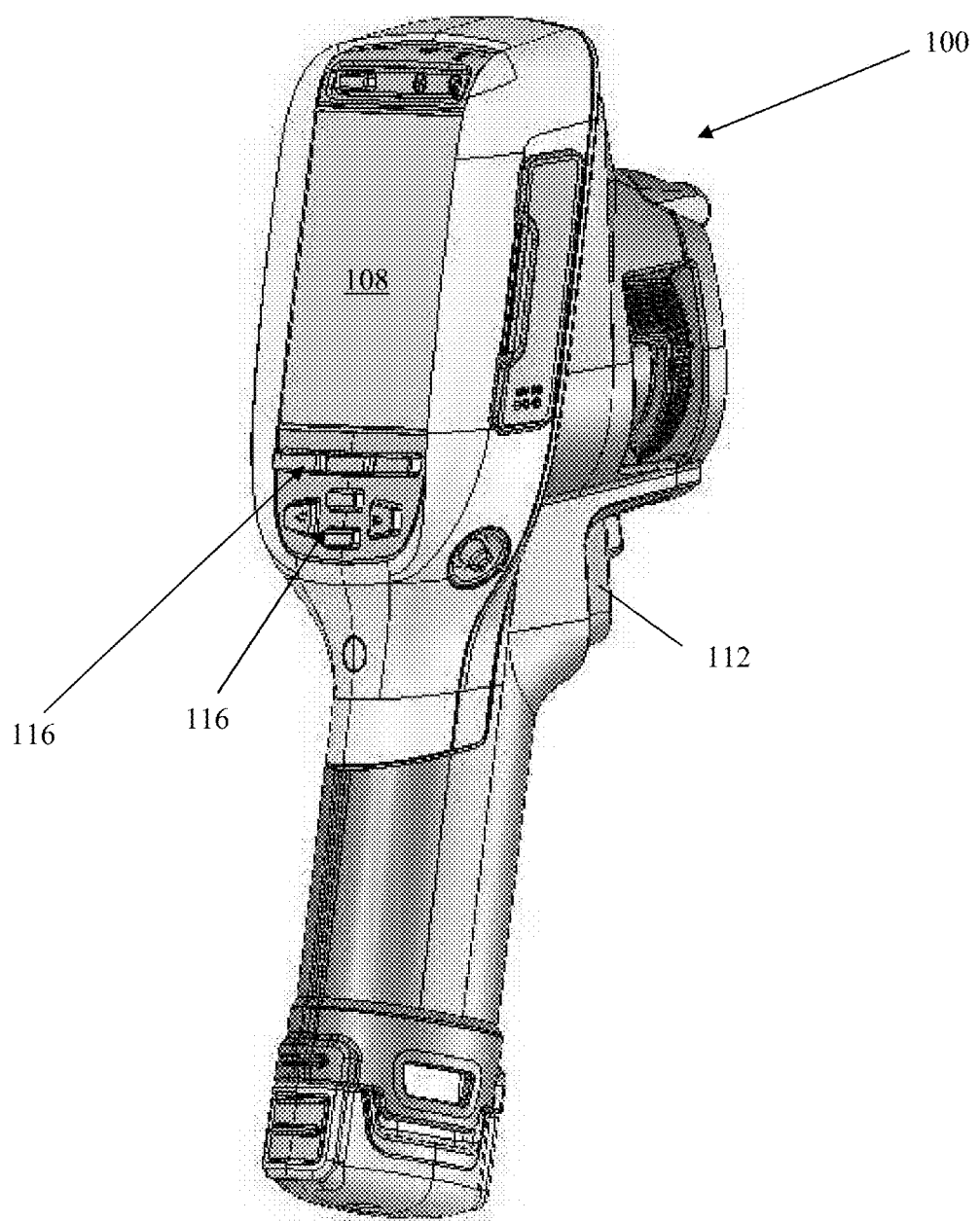
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a composite IR and VL image that is a simultaneous display of the visible light image and the infrared image. In different examples, display 108 may be remote (e.g., separate) from infrared lens assembly 104 and visible light lens assembly 106 of thermal imaging camera 100.

The infrared sensor may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements.

Thermal imaging camera 100 contains a processor (processing circuitry), that may also include memory that stores program instructions and related data that, when executed by the processor, cause thermal imaging camera 100 and the processor to perform many different functions. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, such as an output workstation. The processor (processing circuitry) sends the processed data to a display 108 or other output/control device 140. Independent of the specific circuitry, thermal imaging camera 100 may be configured to manipulate data representative of a target scene so as to provide an output that can be displayed, stored, transmitted, or otherwise utilized by a user.

The processor may control display 108 to display the visible light image and the infrared image as a composite image.

In a composite image, the visible light image and the infrared image may be superimposed on top of one another. An operator may interact with user interface 138 to control the transparency or opaqueness of one or both of the images displayed on display 108. For example, the operator may interact with user interface 138 to adjust the infrared image between being completely transparent and completely opaque and also adjust the visible light image between being completely transparent and completely opaque. Such an example composite image, which may be an alpha-blend of the infrared and visible imagery using a selected blending ratio, may allow an operator to adjust display 108 to display an infrared-only image, a visible light-only image, of any overlapping combination of the two images between the extremes of an infrared-only image and a visible light-only image. The processor may also combine scene information with other data, such as radiometric data, alarm data, and the like.

The operator may receive output from thermal imaging camera 100 via display 108. The processor may control display 108 to display an infrared-image and/or a visible light image in any acceptable palette, or color scheme, and the palette may vary, e.g., in response to user control. In some examples, the processor controls display 108 to display an infrared image in a monochromatic palette such as grayscale or amber. In other examples, display 108 is configured to display an infrared image in a color palette such as, e.g., ironbow, blue-red, or other high contrast color scheme. The combination of grayscale and color palette displays is also contemplated.

Figure 3:
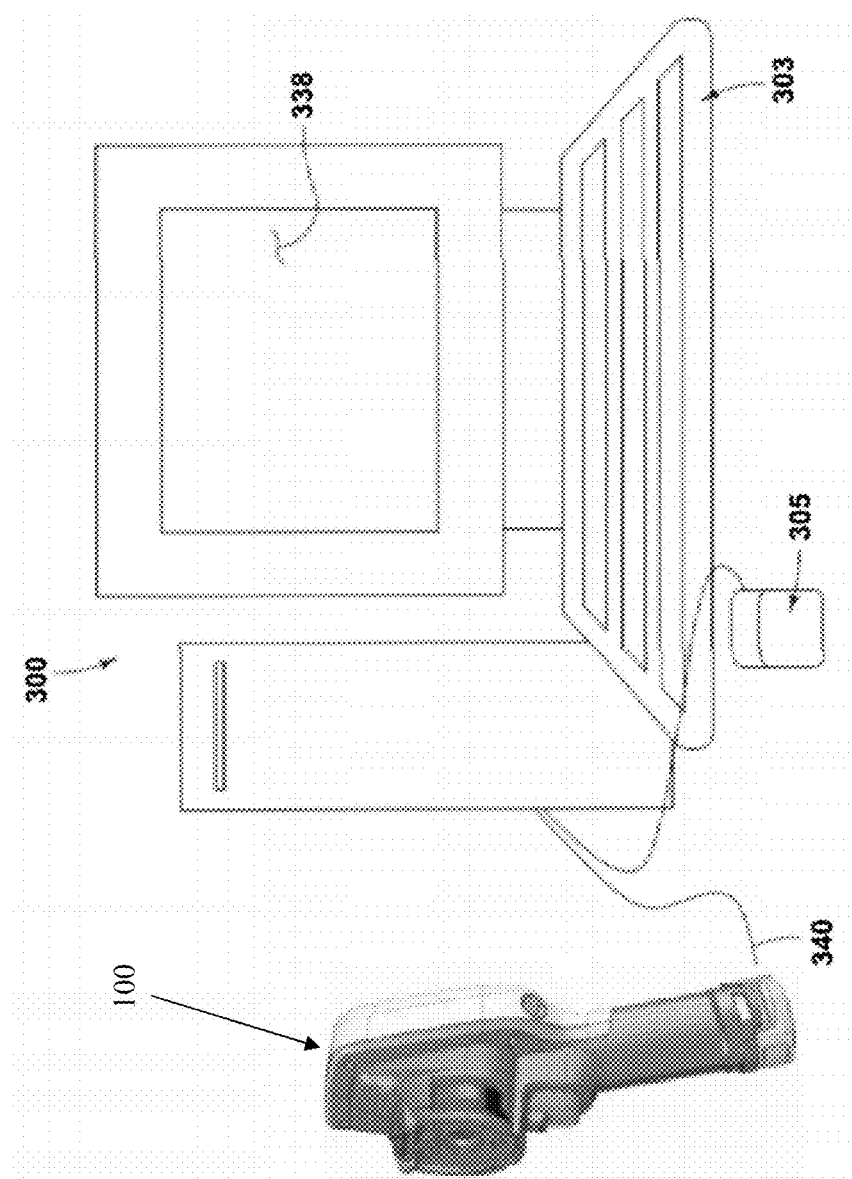
FIG. 3 is a schematic of an example thermal imaging camera connected to a workstation.

As noted above, the processor (processing circuitry) sends the processed data to a display 108 or other output/control device 140. FIG. 3 is a schematic of an exemplary thermal imaging and analysis system, which includes thermal imaging camera 100 connected to another output/control device. In particular, output/control device is workstation 300 in FIG. 3. Many types of workstations 300 may be used, for example, a personal computer, a tablet computer, a smartphone, or other type of computing device on which a thermography software program, adapted for displaying and manipulating data, which is transferred from camera 310, is loaded. In certain embodiments, thermal imaging camera 100 has the capability to display the IR and/or VL images on the workstation 300. In certain embodiments, the data associated with the IR and/or VL images captured by the thermal imaging camera 100 may be transferred to workstation 300. FIG. 3 illustrates a data transfer cord 340 coupling camera 100 to workstation 300, for data transfer therebetween. It should be understood that alternative means, such as wireless communication and/or a plug-in memory card may be employed to transfer the data. With further reference to FIG. 3, workstation 300 is shown including a keyboard 303 and a mouse 305, either of which may be used to manipulate interactive elements of user interfaces of the present invention. Of course, other known types of user interfaces may be used, including a touchscreen or other interactive display screen.

In order for a user to more easily understand the information conveyed by the thermal image, programming may be used which animates the thermal image or the thermal image portion of a picture-in-picture or blended image. For example, the programming may automatically toggle or scroll the displayed thermal image through two or more presentations. When the programming automatically scrolls the displayed thermal image through multiple presentations in a step wise manner, the scrolling can be timed to be sufficiently fast that the image appears like an animated video. However, the image is in fact from a single time point, and the appearance of change over time which creates the likeness of a video is due only to presenting the same image in a way that varies over time.

In one example, the display of the thermal image may include a temperature band within which the image is displayed in a color or a color spectrum that contrasts with the other portions of the thermal image. For example, if the thermal image is shown in grayscale or other monochromatic scale, the temperature band may be displayed in a single color, such as red, or in a color spectrum that contrasts with the rest of the image, such as by having no colors in common between the temperature band and the rest of the thermal image. If the thermal image is shown in a color palette including multiple colors, the temperature band may be a single color which is not a component of the color palette of the thermal image, or may be a color palette that contrasts (for example, does not include any colors in common) with the rest of the thermal image, or may be grayscale or other monochromatic scale. The choice of the thermal imaging color palette and/or of the temperature band color or color palette may be set automatically by the program or one or both may be selected by the user.

The use of a temperature band is similar in some ways to an "isotherm" which is used in thermal imaging to highlight portions of an image falling between a selected upper and lower temperature limit by using a contrasting color. In the same way, the temperature band highlights a portion of a thermal image falling within a temperature range. However, unlike the isotherm which is a static image in which the defined temperature range is fixed, the temperature range defining the temperature band changes automatically over time in a stepwise manner.

In some embodiments, the temperature band is a range of temperatures from an upper limit to a lower limit, in which the upper and lower temperature limits of the temperature band vary stepwise over time, but in which the difference between the upper and lower temperature limits (the size of the band) remains constant. For example, the temperature band may initially be defined at all temperatures between 200 and 220 degrees F. As the temperature band automatically changes, it may increase or decrease stepwise, with the upper and lower limits of the temperature band increasing or decreasing by equal amounts. For example, the temperature band may change next to 199 to 219 degrees F., and then to 198 to 218 degrees F., and so on. As the upper and lower limits of the temperature band change over time, the contrasting highlighted portions of the displayed thermal image falling within the temperature band likewise changes. The stepwise changes of the temperature band upper and lower limits as shown in the displayed thermal image occur automatically and can be timed to appear smooth and seamless, such that the contrasting temperature band appears to flow in the thermal image in the direction of the temperature change. The result is an animation that simulates the flow of heat over time, though in fact it is created from a picture taken at a single point in time.

Figure 4:
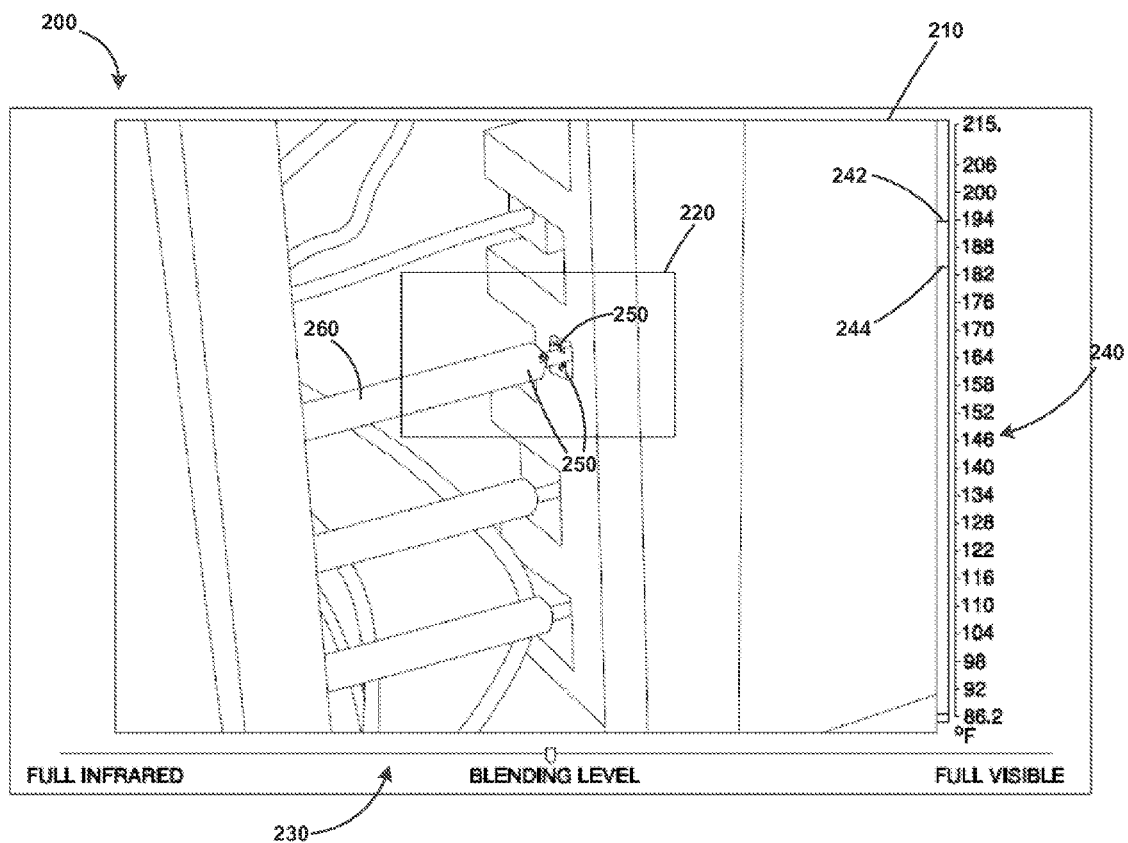
FIG. 4 is a thermal image of a circuit breaker including an automatically adjusting temperature band at a first time point.
Figure 5:
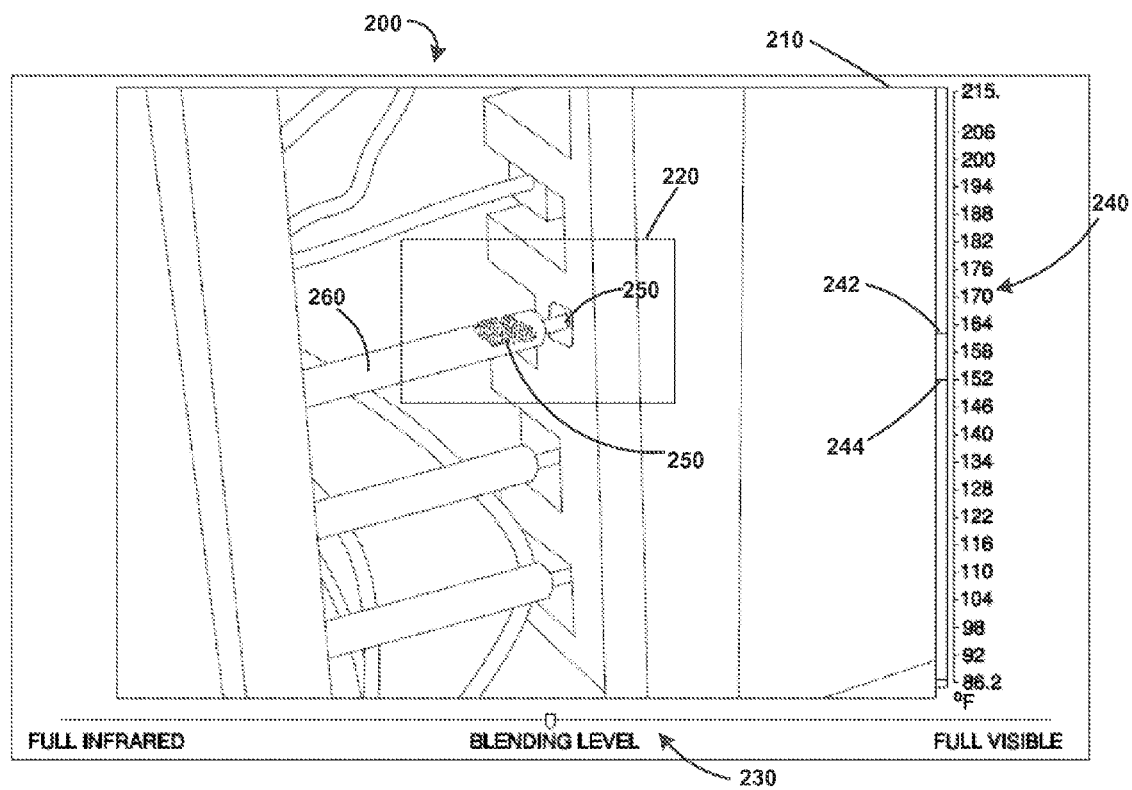
FIG. 5 is the thermal image of FIG. 4 at a second time point after the temperature band has moved to a lower temperature range.
Figure 6:
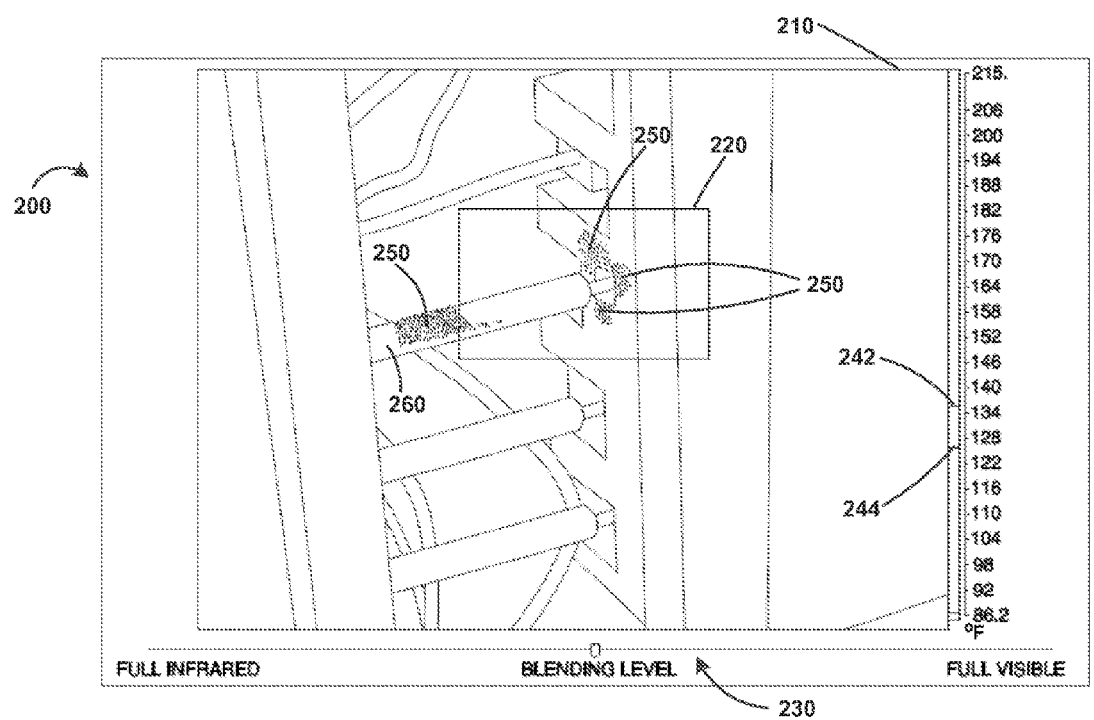
FIG. 6 is the thermal image of FIG. 4 at a third time point after the temperature band has moved to a still lower temperature range.

An example of a heat flow animation using a varying temperature band as may be shown on a display according is shown in FIGS. 4-6, in which a thermal image of an electrical breaker panel including several circuit breakers is shown at different time points in the animation. For ease of representation in a line drawing, the portions of the image falling within the temperature band is represented by speckling 250 to represent a contrasting color, while the portion of the image outside of the temperature band are line drawings without speckling 250. The upper limit 242 and lower limit 244 of the temperature band are indicated on the temperature scale 240 on the right on each figure. In some embodiments, a user may interact with the image to adjust the upper and lower limits 242, 244 using the temperature scale 240, for example. A first time point is shown in FIG. 4, in which the range of temperatures falling within the temperature band is approximately 183 to 194 degrees F. The portion of the image falling within the temperature band can be seen at the connection of the circuit breaker 260 to the slot bracket. At a second later time point shown in FIG. 5, after the temperature band has moved down to approximately 152-163 degrees F., the speckling 250 representing portion of the image falling within the now lower temperature band is now spaced apart but still close to the connection end of the circuit breaker 260. At a later third time point shown in FIG. 6, the temperature band has moved further lower to approximately 126-135 degrees F., and the speckling 250 representing the portion of the image falling within this even lower temperature range of the temperature band is now in the middle portion of the circuit breaker 260 as well as the portion of the breaker panel surrounding the circuit breaker connection. Each figure represents a different presentation of the same thermal image that was captured at a particular point in time. The presentation of the image is modified by the programming to create an animation that changes over time as observed by a user, and FIGS. 4-6 represent the changing presentation of the image as shown on a display. Furthermore, it should be understood that, in the example shown, the thermal image presentation transitions gradually from that shown in FIG. 4 to FIG. 5 and to FIG. 6 and beyond with a series of thermal image presentations between each figure to create the appearance of a smooth transition. As a result, the portion of the image falling within the temperature band appears to move from the circuit breaker connection on the right (the hottest point) leftward along the length of the circuit breaker 260, and also to from the connection point radiating outward along the breaker panel. This way, as the temperature band automatically transitions from a higher to a lower range, the resulting animation appears to track heat flow. For example, if the thermal image of FIGS. 4-6 is shown in grayscale, and the portion of the image within the temperature band (the speckling 250 portion) appears as red, the red portion would appear to start at the connection between the circuit breaker 250 and the slot bracket and then spread outward in the manner akin to the spread of heat. The use of the temperature band in this way therefore allows a user to more easily understand the information being shown in a thermal image such as how the heat flows, than could be appreciated from a static image or a single isotherm.

In some embodiments, the user can control the temperature band, such as by selecting one or more of the following sections for a particular thermal image: the initial upper limit of the temperature band, the initial lower limit of the temperature band, the size of the temperature band (the difference between the upper and lower limits of the temperature band), and/or the range of temperatures over which the temperature band will sweep (that is, the upper and lower temperature limits of the temperature band sweep). Other variables that may be selected by the user include the color or monochromatic palette used for the thermal image outside of the temperature band, the type of contrasting color, color palette, or monochromatic palette used for the portion of the image within the temperature band (by selecting a single color, a particular color palette, or grayscale or monochromatic scale), the speed with which the temperature band changes/sweeps, and/or the size of the increment of change (e.g. number of degrees, or size of the fraction of a degree) with each step of change of the temperature band. In some embodiments, the user may be able to adjust one or more of these variables during the animation, in order to see the effect of the adjustment. In some embodiments, one or more of these variables may be selected by the program or may be preset.

Other types of animation of a thermal image are also contemplated, which may result in an automatically toggling image or a streaming type of image. In some embodiments, the changing presentation allows a user to automatically view an image in a variety of ways in order to select a desired mode of presentation. For example, the composite thermal and visible light image, or a portion thereof, may transition from a fully visible light image, stepwise through a series of one or more blended images in which the infrared image proportion increases and the visible light image proportion decreases incrementally with each successive image presentation, to a fully infrared image. The image may then return back stepwise through blended images to a fully visible light image, in reverse of the first series, and may repeatedly flow back and forth in this way from full visible light to full infrared image. Alternatively, the image may progress gradually from full visible light to full infrared, and then may directly skip from full infrared back to full visible light, and continue in a repeating circuit. Alternatively, the image may sweep in the reverse direction, from full infrared to blended to full visible light. The user may stop the image during the animated progression to select a desired form of image presentation. The user may then restart the changing image and stop it again as desired.

In another embodiment, the thermal image may automatically change through a series of color palettes and/or monochromatic palette options. For example, the image may shift automatically between one or more of a grayscale, a monochromatic scale, a first color palette presentation, a second color palette presentation, etc. When a desired color palette or monochromatic scale is shown, the user may select that color palette or scale by stopping the automatic cycling of the animation. Optimally, the user may restart the cycling of the animation to continue viewing options. In this way, the user can easily identify the ideal color palette or monochromatic scale to be used for a particular thermal image.

In certain embodiments, the span or the level of the thermal image may automatically change through a series of spans and/or levels. In thermography, span generally refers to the difference between the high and low temperature settings on a thermal image or on the palette of colors used to indicate the measured temperatures in a thermal image. The palette used for the image within the span, as noted above, may be a color palette or monochromatic palette. Level typically means the mid-point or average of that span. Temperatures above or below the span are typically shown with a saturation color, sometimes with a cold saturation shown with a different color from that shown for a hot saturation. In certain embodiments, the span may be fixed, but the thermal image may be animated by varying the level. In certain embodiments, the level may be fixed, but the thermal image may be animated by varying the span. In certain embodiments, the thermal image may be animated by varying both the span and the level. The variation of the span and/or the level may be that as described above for other types of thermal image animation. For example, the span may be fixed automatically or manually at 20 degrees F., and the level may initially be defined at 0 degrees F. In such an example, portions of the thermal image having temperatures between −10 degrees F. and 10 degrees F. would be shown using the selected color palette and colors above and below −10 and 10 degrees F. would be shown using the saturation colors. The level could then be varied automatically to increase or decrease stepwise. For example, the level may change next to 20 degrees F., providing a color palette of temperatures extending between 10 and 30 degrees F. if the span remains fixed. Next, the level could change, for example, to 40 degrees F., providing a color palette between 30 and 50 degrees F., and so on. As level changes, the portions of the displayed thermal image falling within the color palette likewise changes. In another example, the level may be fixed automatically or manually at 50 degrees F., and the span may initially be defined at 20 degrees F. In such an example, portions of the thermal image having temperatures between 40 degrees F. and 60 degrees F. would be shown using the selected color palette and colors above and below 40 and 60 degrees F. would be shown using the saturation colors. The span could then be varied automatically to increase or decrease stepwise. For example, the span may change next to 40 degrees F., providing a color palette of temperatures extending between 30 and 70 degrees F. if the level remains fixed. Next, the span could change, for example, to 60 degrees F., providing a color palette between −10 and 110 degrees F., and so on. As span changes, the portions of the displayed thermal image falling within the color palette likewise changes. The variation of the span and/or the level may continue automatically through an increasing or decreasing sequence of value and may then return back to an initial setting or reverse the stepwise changes back towards the initial setting. The user may stop the image during the animated progression to select a desired form of image presentation. The user may then restart the changing image and stop it again as desired.

In one particular example, the image may be presented as a blended infrared and visible light image, and the user may be able to select the level of blending but always included some amount of infrared image in the blended image. The infrared portion of the image within the temperature band may be presented as a color palette or by a single color which replaces the infrared image in the blended image. In some embodiments, the infrared portions of the image within the color band are presented as a single color. In some such embodiments, the infrared portion of the image (outside of the color band) may be presented in the grayscale, to enhance the contrast between the infrared image within and outside of the temperature band. In embodiments like this in which the color band replaces the infrared portion of the image, the remainder of the image outside of the color band is a blended or infrared image and not a full visible light image such that the infrared image portion can be replaced by the temperature band color when it falls within the temperature band during the automation.

In still other embodiments, the visual presentation of the image may provide an animation resembling an automated "color alarm" image. As in other embodiments, a single thermal image is used for the animation. The image is displayed as a visible light image, with only the portions of the image which fall within the temperature band displayed with an infrared image component. The portions of the image within the temperature band may appear as full infrared or blended infrared and visible light and this choice as well as the amount of blending, if any, may be selected by the user. The infrared display of the portions of the image within the temperature band may be in a single color or any color palette and the color or color palette choice may be selected by the user. In such images, the only portions of the image which are shown as infrared are the portions that fall within the temperature band. In some embodiments, the infrared display of the portions of the image within the temperature band is shown in a color palette. The upper and lower temperature limits that define the temperature band may be set by the user, and the temperature band limits may shift stepwise upward or downward to sweep through a range of temperatures as described elsewhere in this application.

Each of the embodiments described herein may be used with a normal 2-dimensional image or alternatively with a 3-dimensional thermal image, that may be used in combination with a 2-dimensional image. A non-limiting example of such a 3-dimensional image is described in US Patent Publication No. 20100058222A1, entitled "Graphical User Interfaces And Methods For Thermography," which is hereby incorporated by reference. Three dimensional thermal images may include a 2-dimensional image (infrared, visible light, or blended) with a corresponding 3-dimensional thermal image representation which may appear to be above and spaced apart from the 2-dimensional image. For example, the 3-dimensional image may appear to project upward (away from the 2-dimensional image) in an amount that corresponds to the temperature of the image in that location, resulting in a range of peaks and valleys. The lowest temperature portions of the image may appear to be lowest areas of the 3-dimensional image, like valleys, and the highest temperature portions may appear to be at the highest elevations, like mountains peaks. In addition, a color palette or grayscale may be used along with the relative elevations of the 3-dimensional image to represent the temperature of each location of the image, with the colors corresponding to the highest temperatures at the highest elevations on the 3-dimensional image and the colors corresponding to the coolest temperature at the lowest elevations on the 3-dimensional image. Because the 3-dimensional image portion is actually presented in a 2-dimensional format such as on a display screen, the image is not truly 3-dimensional but rather is a model of 3 dimensions in which perspective and color variation may be used to simulate the appearance of a 3-dimensional form. As a result, the 3-dimensional form of the model may be tilted and turned by a user to allow the user to better appreciate the 3-dimensional nature of the image by changing the user's perspective. Any of the image animation methods described herein relating to 2-dimensional images may also be applied to the three dimensional thermal image. For example, a contrasting color or color spectrum may be used for portions of the 3-dimensional thermal image within a color band, and the color band may automatically sweep stepwise to higher or lower temperature ranges. This may result in the contrasting color or color palette of the temperature band appearing to sweep up (for a rising temperature band) or down (for a falling temperature band) through the elevations of the 3-dimensional thermal image.

The embodiments in which alternative presentations of a thermal image are presented to a user may be controlled by programming in a processor in the thermal imaging camera itself or in a separate system such as the workstation 300. The alternative presentations may be shown in the display of the thermal imaging camera or on a separate display, such as a workstation display or monitor. The animated thermal image may be of a single frame of a thermal image, a continuous stream of images (e.g., video) coming from the thermal imaging camera, or thermal images coming from a different thermal imaging camera. In addition, the animated thermal image may be displayed concurrently with an unanimated thermal image, such as an unanimated static thermal image or an unanimated continuous stream of images. Finally, the user controls for the animation may be on the thermal imaging camera itself, such as buttons or touchscreen controls as described herein, or may be performed through interactions with the computer or other device, for example. For instance, a user could initiate the animation and then stop the animation when the display setting provide a desirable or useful image setting (e.g., 50/50 blend, temperature band that shows useful imagery, etc.). Non-limiting examples of graphical user interfaces and interactive elements that may be used are disclosed in U.S. Pat. No. 7,639,843, entitled "Legend including transparent zone," and in U.S. Pat. No. 8,386,951, entitled "Novel Display Adjustment Features," both of which are hereby incorporated by reference.

In some embodiments, the animated image may repeatedly cycle through the animation. The programming may further allow this cyclical animated thermal image, such as the "heat flow" images described above, which may or may not repeatedly cycle through the animation, to be converted to and saved as a file which may be played using standard software, such as an mpeg file. In this way, the file could transferred to and played using a separate processor, such as the workstation or any other computerized device, such as a smartphone, electronic tablet, or on a website, and viewed by systems which do not have the programming for interacting with a thermal image, such as SmartView® Thermal Imaging Analysis and Reporting Software program, sold by the assignee of the instant application.

Example thermal image cameras and related techniques have been described. The techniques described in this disclosure may also be embodied in or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. A non-transitory computer-readable storage medium comprising instructions that cause a programmable processor to control a graphical user interface for the display of thermal images, the graphical user interface comprising:
   an image display area presenting an image of a scene, the image having been captured by a thermal imaging device, the image being displayed as a visible light image, a thermal image in a first color scale or monochromatic scale, or a combined visible light image and thermal image in the first color scale or the monochromatic scale,
   wherein the displayed image includes a temperature band representing a range of temperatures, the range of temperatures being between a band maximum temperature and a band minimum temperature, wherein a portion of the image having a temperature which falls within the range of temperatures is presented in a color or in a second color scale or monochromatic scale that contrasts with the first color scale or monochromatic scale,
   wherein the band maximum temperature and the band minimum temperature automatically and incrementally increase or decrease over time such that the portion of the displayed image having a temperature which falls within the range of temperatures changes over time.

2. The non-transitory computer-readable storage medium of claim 1, wherein the band maximum temperature and the band minimum temperature automatically return to an initial band maximum temperature and an initial band minimum temperature after a period of time before again automatically and incrementally increasing or decreasing over time.

3. The non-transitory computer-readable storage medium of claim 2, wherein the band maximum temperature and the band minimum temperature automatically and repeatedly return to the initial band maximum temperature and the initial band minimum temperature after each of the periods of time before then again automatically and incrementally increasing or decreasing over time.

4. The non-transitory computer-readable storage medium of claim 1, wherein the difference between the band maximum and the band minimum temperature remains constant while the band maximum temperature and the band minimum temperature automatically and incrementally increase or decrease over time.

5. The non-transitory computer-readable storage medium of claim 1, wherein the graphical user interface further comprises an interactive element adapted for stopping the band maximum temperature and the band minimum temperature from increasing or decreasing such that the portion of the image having a temperature which falls within the range of temperatures stops changing over time.

6. The non-transitory computer-readable storage medium of claim 5, wherein the interactive element is further adapted for resuming the increase or decrease of the band maximum temperature and the band minimum temperature.

7. The non-transitory computer-readable storage medium of claim 1, wherein the graphical user interface further comprises an interactive element adapted for selecting a size of the range of temperatures.

8. The non-transitory computer-readable storage medium of claim 7, wherein the graphical user interface further comprises an interactive element adapted for selecting the color or second color scale of the range of temperatures.

9. The non-transitory computer-readable storage medium of claim 1, wherein the graphical user interface is further adapted for selecting a speed of increase or decrease of the band maximum temperature and the band minimum temperature.

10. The non-transitory computer-readable storage medium of claim 1, wherein the graphical user interface further comprises an interactive element adapted for selecting the colors of the first color scale.

11. The non-transitory computer-readable storage medium of claim 1, wherein the first color scale comprises a monochromatic scale and wherein the second color scale comprises a single color which is not on the monochromatic scale.

12. The non-transitory computer-readable storage medium of claim 11, wherein the graphical user interface further comprises an interactive element adapted for selecting the single color of the second color scale.

13. The non-transitory computer-readable storage medium of claim 1, wherein the first color scale comprises a monochromatic scale and wherein the second color scale comprises a spectrum of colors not on the monochromatic scale, wherein the colors on the spectrum of colors of the second color scale each correlate to a second range of temperatures.

14. The non-transitory computer-readable storage medium of claim 1, wherein the image being displayed as a visible light image, a thermal image, or a combined visible light image and thermal image.

15. A thermal imaging camera comprising:
   an infrared sensor assembly;
   a lens configured to focus infrared energy on the infrared sensor assembly
   a housing;
   a display;
   a processor; and a software program used by the processor for providing a graphical user interface on the display operable on the processor, the interface comprising:
   an image display area presenting an image of a scene, the image captured by a thermal imaging device, the image being displayed as a visible light image, a thermal image in a first color scale, or a combined visible light image and thermal image in the first color scale,
   wherein the image includes a temperature band representing a range of temperatures, the range of temperatures being between a band maximum temperature and a band minimum temperature, wherein a portion of the image having a temperature which falls within the range of temperatures is presented in a color or in a second color scale that contrasts with the first color scale,
   wherein the band maximum temperature and the band minimum temperature automatically and incrementally increase or decrease over time such that the portion of the displayed image having a temperature which falls within the range of temperatures changes over time.

16. The thermal imaging camera of claim 15, wherein the graphical user interface further comprises an interactive element adapted for stopping the band maximum temperature and the band minimum temperature from increasing or decreasing such that the portion of the image having a temperature which falls within the range of temperatures stops changing over time.

17. The thermal imaging camera of claim 16, wherein the interactive element is further adapted for resuming the increase or decrease of the band maximum temperature and the band minimum temperature.

18. The thermal imaging camera of claim 15, wherein the graphical user interface further comprises an interactive element adapted for selecting a size of the range of temperatures.

19. The thermal imaging camera of claim 18, further comprising an interactive element adapted for selecting the color or second color scale of the range of temperatures.

20. The thermal imaging camera of claim 15, wherein the software program is adapted for receiving a speed of increase or decrease of the range of temperature from a user.

21. The thermal imaging camera of claim 15, further comprising an interactive element adapted for selecting the colors of the first color scale as a range of colors or gray tones.

22. The thermal imaging camera of claim 15, wherein the display is located remotely from the housing.

23. The thermal imaging camera of claim 22, wherein the display forms part of an electronic tablet, computer, or smartphone.

24. A thermal image visualization system comprising:
a processor;
a software program operable on the processor for controlling a graphical user interface for the display of thermal images, the graphical user interface comprising:
   an image display area presenting an image of a scene, the image being displayed as a visible light image, a thermal image, or a combined visible light image and thermal image, and
   wherein the displayed image repeatedly cycles through two or more color scales by each cycle automatically and sequentially appearing in the two or more color scales.

25. The thermal image visualization system of claim 24, wherein the graphical user interface further comprises an interactive element adapted for sending a signal to stop the repeated cycling through the two or more color scales such that the displayed image maintains the color scale appearing on the display when the interactive element sends the signal to stop.

26. The thermal image visualization system of claim 24, wherein the processor, software program, and the graphical user interface are integrated into at least one of a personal computer, an electronic tablet computer, and a smartphone.

27. A non-transitory computer-readable storage medium comprising instructions that cause a programmable processor to control a graphical user interface for the display of thermal images, the graphical user interface comprising:
   an image display area presenting a composite image of a scene, the composite image composed of a blended ratio of a visible light image of the scene and a thermal image of the scene, the image automatically, continuously, and repeatedly cycling between two or more successive blending ratios, each successive blending ratio progressively increasing or progressively decreasing.

28. The non-transitory computer-readable storage medium of claim 27, wherein a first blending ratio of the two or more successive blending ratios corresponds to a composite image having the visible light image of the scene without the thermal image of the scene or to the thermal image of the scene without the visible light image of the scene.

29. The non-transitory computer-readable storage medium of claim 27, wherein the two or more successive blending ratios is four or more successive blending ratios.

30. The non-transitory computer-readable storage medium of claim 27, further comprising an interactive element adapted for sending a signal to the processor to stop the cycling such that the image maintains the appearance on the display, and wherein the software program operable on the processor controls the graphical user interface to stop the cycling after receiving the signal to stop cycling.

31. The non-transitory computer-readable storage medium of claim 30, wherein the interactive element is further adapted for resuming the cycling of the appearance of the image on the display.

32. The non-transitory computer-readable storage medium claim 27, further comprising an interactive element for adjusting the speed with which the appearance of the image cycles.

33. The non-transitory computer-readable storage medium claim 27, further comprising a computer-readable medium storing the image of the scene, the computer readable medium being one of random access memory (RAM), read only memory (ROM), magnetic memory, and optical media.

34. The non-transitory computer-readable storage medium claim 33, wherein the image of the scene is captured by a thermal imaging camera.

35. The non-transitory computer-readable storage medium claim 33, wherein the image display area presents an internet website with the image of the scene.

36. A thermal image visualization system comprising:
a processor;
a software program operable on the processor for controlling a graphical user interface for the display of thermal images, the graphical user interface comprising:
   an image display area presenting a thermal image of a scene, the thermal image being displayed with a color or monochromatic palette of colors having a span and a level, and the image automatically, continuously, and repeatedly cycling between at least one of (i) two or more successive span amounts, each successive span amount progressively increasing or progressively decreasing, and (ii) two or more successive level amounts, each successive level amount progressively increasing or progressively decreasing.

37. The thermal image visualization system of claim 36, wherein the thermal image is a composite image of the scene composed of a visible light image of the scene and a thermal image of the scene.

\* \* \* \* \*